United States Patent [19]

Howell et al.

[11] 4,229,040
[45] Oct. 21, 1980

[54] SEAT SUPPORT STRUCTURE

[75] Inventors: Russell B. Howell, Pfafftown; Ralph G. Marrujo, Winston-Salem, both of N.C.

[73] Assignee: Fairchild Industries, Inc., Germantown, Md.

[21] Appl. No.: 964,269

[22] Filed: Nov. 27, 1978

[51] Int. Cl.² .............................................. A47C 1/00
[52] U.S. Cl. .................................. 297/355; 297/232; 297/248; 297/344; 297/417; 297/440; 297/445
[58] Field of Search .............. 5/310; 108/64; 248/188, 248/188.1, 165, 172, 424, 501; 247/232, 248, 344, 440, 445, 452, 451

[56] References Cited

U.S. PATENT DOCUMENTS

| | | | |
|---|---|---|---|
| 1,100,701 | 6/1914 | Kreuzkamp | 5/310 X |
| 3,316,013 | 4/1967 | Abel et al. | 297/232 X |
| 3,652,050 | 3/1972 | Marrujo et al. | 297/344 X |
| 4,099,780 | 7/1978 | Schmidhuber | 297/232 X |

FOREIGN PATENT DOCUMENTS 2360441  11/1975  France ..................................... 297/232

Primary Examiner—James C. Mitchell
Attorney, Agent, or Firm—Michael W. York

[57] ABSTRACT

A lightweight, economically constructed support structure for vehicle seats having a minimum number of components having a substantial commonality and a number of interchangeable components. The seat support structure includes a pair of spaced horizontal tubular members which extend beneath individual seating stations. These tubular members are maintained in a predetermined spaced relationship by a multiplicity of spacing members each located adjacent to the individual seating stations and adapted to support the pivotable armrest situated between each seating station. The horizontal tubular members and associated structure support a diaphragm of fabric or the like at each seat location which is stretched between and fastened to the forward tubular member and a plate member supported and located in proximity to the rear tubular member. These diaphragms are adapted to support the individual seat cushions at each seat location. Each of the spaced tubular members is also provided with a plurality of spaced apertures which facilitate the reception of fastenings which can be used to secure seat legs to the tubular members at different locations in order to locate the leg positions so that they will correspond to varying seat locking track locations that may be provided in the floor of a vehicle in which the seat structure may be mounted. The seat legs are identical to one another and have a bifurcated lower end which can accommodate a seat track locking fixture and supporting members that are fixed to the leg structure to furnish added rigidity thereto.

8 Claims, 4 Drawing Figures

U.S. Patent
Oct. 21, 1980
4,229,040
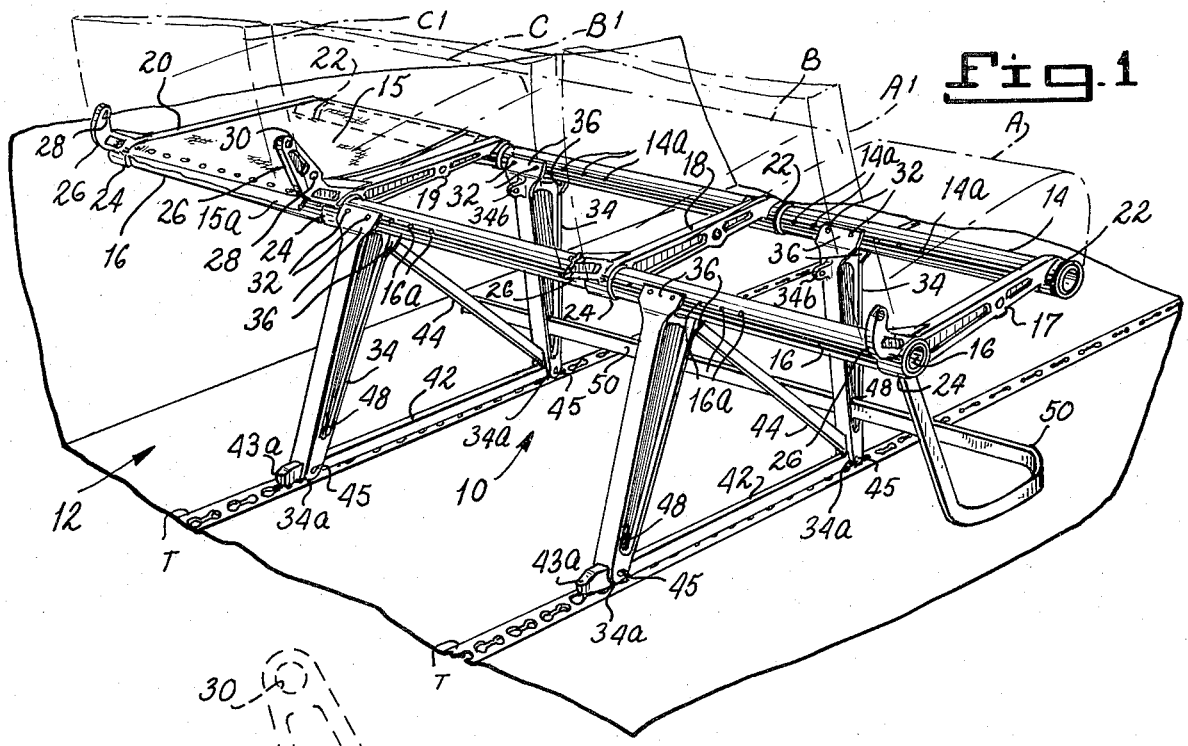
Fig.1
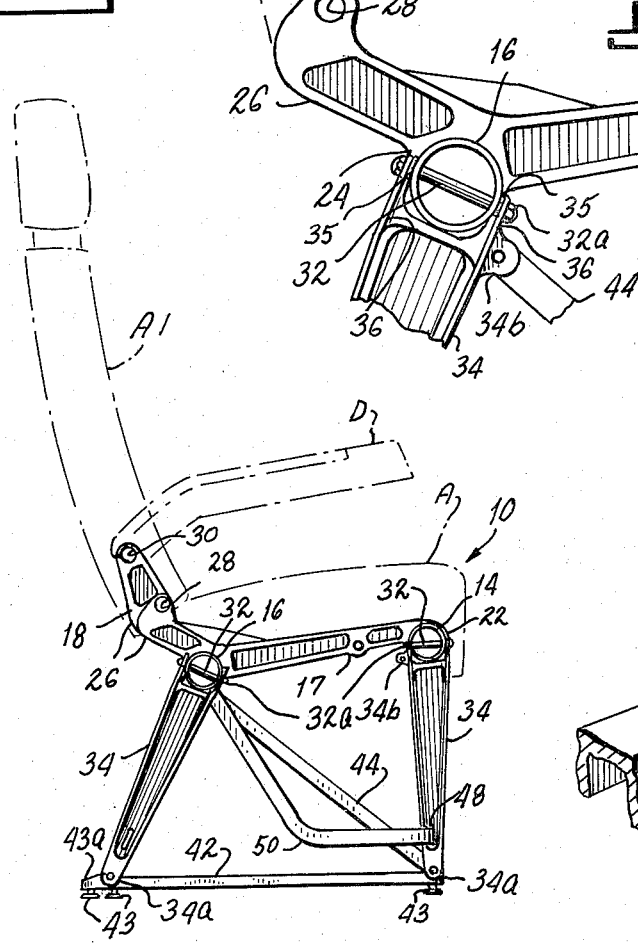
Fig.2
Fig.3
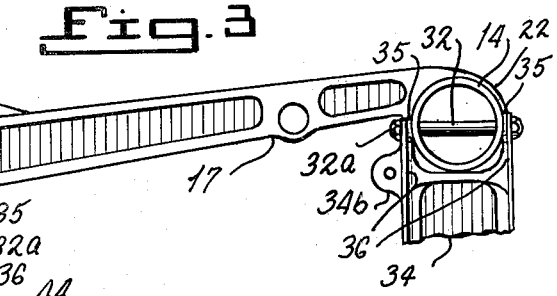
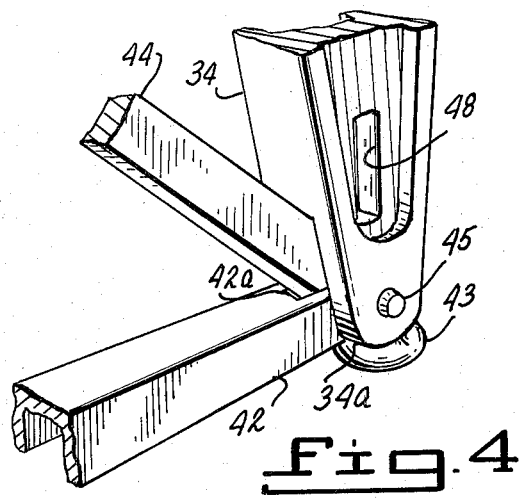
Fig.4

SEAT SUPPORT STRUCTURE

BACKGROUND OF THE INVENTION

Seat support structures for vehicle seats and the like must be sturdy and substantial structures that are capable of supporting the seat and its occupants during normal usage as well as under severe conditions that might impose extraordinary loads on the structure as would be the case during violent or abrupt maneuvering of the vehicle or in the event of an accident or crash. Moreover, as is often the case, a majority of vehicle seats accommodate two, three or more occupants and are supported by a structure that is common to all of the adjacent seat places in a single row so that an adequate structure that has the capability of supporting such a multiple seating arrangement and its occupants, must of necessity possess sufficient strength to absorb all of the stresses exerted on the structure during normal as well as emergency conditions throughout its service life. Consequently, when the normal safety margins are incorporated, such seat support structures tend to be relatively heavy substantial structures with considerable bulk and/or a complex network of struts and similar stress absorbing members.

Consequently, it is not unusual for the structure or some of its members to encroach upon the under seat space available for leg and foot room for the seat occupants in the preceding seats when the seats are arranged in rows as in most vehicles.

As is well known in aircraft seating arrangements, the underseat area is normally utilized to accommodate carry-on parcels such as overnight bags, brief-cases, purses and the like and any incursions by the seat structure upon the space that would otherwise be available for these purposes constitutes a great inconvenience to the passengers. Moreover, the aircraft owner/operators are never favorably disposed toward such structures that could discourage patronage.

Furthermore, it can be readily appreciated that in aircraft seat support structures, any unnecessary weight associated with the seat structures has a deleterious and domino effect on the aircraft's performance in a variety of ways not the least of which is a notable reduction in the aircraft's payload capability and operational profitability.

In addition, most aircraft as well as a number of other types of vehicles are provided with seat securing tracks constructed in the floor and made integral with the vehicle structure so that seating loads are transmitted to the primary aircraft structure. Obviously since each aircraft type varies in design and structure, the seat track locations can vary according to the type and model of aircraft. As a consequence, many aircraft seats must either be designed to accommodate a particular type or model of aircraft, or incorporate some means of accommodating the variations encountered in the seat track locations in different types of aircraft and vehicles. Frequently, attempts to increase the versatility of the seat structures in this regard results in added complexity and weight of the seat support structure.

SUMMARY OF THE INVENTION

This invention relates to vehicle seats and more particularly, to an improved vehicle seat support structure that is exceptionally strong and light in weight.

Accordingly, it is the primary object of the present invention to provide an improved lightweight vehicle seat support structure that may readily accommodate the normal and emergency stresses that may be imposed on the structure during its service life.

It is another object of the present invention to provide such an improved lightweight seat support structure in which the components react individually and collectively to absorb and dissipate a maximum amount of energy that may be imposed on the structure in the event of an accident or crash of the vehicle in which the structure is mounted.

It is another object of the present invention to provide an improved lightweight vehicle seat support structure that will absorb all of the aforementioned stresses with a minimum number of components.

It is also an object of the present invention to provide an improved lightweight vehicle seat support structure in which a substantial number of similar components are interchangeable.

It is another object of the present invention is to provide an improved lightweight vehicle seat support structure which can be readily adjusted to accommodate varying attachment points in different vehicles.

It is also an object of the present invention to provide an improved lightweight vehicle seat support structure that permits a maximum amount of underseat space.

The present invention provides a seat support structure having a pair of spaced horizontal tubular members extending across substantially the entire width of the seat. A plurality of identical spacing members are operatively connected to the horizontal tubular members and maintain them in a fixed spaced apart relationship. Pairs of identical leg members are fastened to the tubular members and depend therefrom to support the tubular members a fixed distance above the floor of the vehicle in which the vehicle seats are mounted.

BRIEF DESCRIPTION OF THE DRAWINGS

The invention will be hereinafter more fully described with reference to the accompanying drawings in which:

FIG. 1 is a perspective view of the improved vehicle seat support structure of the present invention shown mounted within a portion of a vehicle such as an aircraft;

FIG. 2 is a side elevation of the seat support structure shown in FIG. 1 and illustrating the relationship of the seat structure with other parts of a typical vehicle seat;

FIG. 3 is an enlarged elevation of a portion of the seat support structure shown in the preceding Figures and illustrating in the greater detail some of the major components of the seat support structure and the fastening means connecting the leg members to other members of the seat support structure; and FIG. 4 is an enlarged perspective view of the lower portion the leg members and related components of the seat support structure.

DETAILED DESCRIPTION OF THE PREFERRED EMBODIMENTS

If reference is made to FIG. 1 in the drawings, it will be noted that a seat support structure in accordance with the teachings of the present invention has been generally designated by the reference numeral 10. A portion of an aircraft passenger compartment 12 is also shown and is typically representative of a vehicle in which the improved seat support structure 10 of the present invention may be utilized.

It will be noted that the seat structure 10 is provided with a pair of tubular members 14 and 16 which are horizontally disposed and are adapted to extend beneath substantially the entire seating arrangement shown in phantom lines in FIGS. 1 and 3 in the drawings. It should be understood that in the present embodiment three separate seating stations are shown to accommodate 3 passengers as would be the case in a fairly common tourist seating arrangement of the type found in many aircraft and other vehicles. However in accordance with the teachings of the present invention, the number of seating stations that may be accommodated by the seat support structure can be readily altered by enlarging or reducing the width of the horizontal tubular members 14 and 16 together with corresponding additions or reductions in the number of associated related components in a manner which will be hereinafter described in greater detail.

As an example, seating stations for 4, 5 or more seat occupants, as might be the case in so called "wide bodied" aircraft or other vehicles, can be readily accommodated by an appropriate enlargement of the seat structure in the above manner, while conversely, fewer or individual seating stations as might be found in first class or customized seating accommodations can also be accommodated by a reduction in the width of the seat structure. However, in the interest of brevity, the present description and drawings will concern itself primarily with a preferred seat structure embodiment which will facilitate the accommodation of 3 passenger seat stations shown in phantom lines in FIG. 1 of the drawing and designated A, B and C therein.

The aforementioned horizontal tubular members 14 and 16 are maintained in their fixed spaced relationship to one another by a plurality of beam members 17, 18, 19 and 20 as best seen in FIG. 1 of the drawings. As best seen in FIG. 1, a fabric diaphragm 15, one of which is shown in the drawings situated between the beam members 19 and 20 is stretched between the horizontal tubular members 14 and a so called "kick plate" member 15a situated above and fixed to the tubular member 16 and is fastened thereto in any well known manner. Similar fabric diaphragms (not shown) for each corresponding seating station, are positioned between beam members 17 and 18, and 18 and 19 beneath each of the seating stations. Each of the fabric diaphragms is adapted to support the seat cushions which may be fixed thereto by velcro fasteners or the like in a well known fashion.

In the present embodiment having three seating stations A, B and C, four of the aforementioned beam members 17, 18, 19 and 20 are provided. Beam members 17 and 20 are identical and interchangeable with one another and beam members 18 and 19 which incorporate an arm rest pivot bearing are identical and interchangeable with one another.

In the present arrangement, one of the beam members 17 is situated at the outermost extremity of the horizontal tubular members 14 and 16 that is furthest from the vehicle wall in which the seat support structure is situated. Usually this location will correspond to an aisle position in the vehicle. The remaining beam members 18 and 19 are situated between adjacent seating stations A and B and C respectively while beam member 20 is situated adjacent to the vehicle wall furthest from the aisle. It should be understood that in the event that additional seating stations are provided to accommodate a greater number of seat occupants, additional beam members similar to 18 and 19 would likewise be situated between each additional seating station. As best illustrated in FIG. 3 in the drawings, the beam members 17 and 20 differ from beam members 18 and 19 in that while the latter members 18 and 19 can accommodate a foldable arm rest between the seating stations, the outermost beam members 17 and 20 do not require these accommodations. All of the beam members 17, 18, 19 and 20 extend in a general fore and aft direction that is perpendicular to the longitudinal axis and the tubular members 14 and 16 and as previously indicated maintain those tubular members 14 and 16 a fixed predetermined distance apart which roughly corresponds to the depth of the vehicle seat cushion as best seen in FIGS. 1 and 3. Each of the beam members 18, 19 and 20 is equipped with an enlarged cylindrical portion 22 at its forwardmost extremity which is adapted to receive and encircle the forwardmost horizontal tubular member 14 to which it may be fastened in any convenient manner (not shown) and permit its passage therethrough. A second enlarged cylindrical portion 24 is positioned a fixed distance behind the enlarged forward portion 22 and is adapted to receive and encircle the rearward horizontal tubular member 16 to which it is similarly fastened in any well known manner and permit its passage therethrough.

In addition, each of the beam members 17, 18, 19 and 20, is furnished with a rearwardly and upwardly extended portion 26 which contains pivot bearings 28 as best seen in FIGS. 1 and 3. Additionally, beam members 18 and 19 are provided with pivot bearing 30 (seen in dotted lines in FIG. 3). These pivot bearings 28 and 30 enable the beam members to support and permit relative movement of the corresponding seat backs A-1, B-1 and C-1 that are associated with seat stations A, B, and C. Arm rest D shown in phantom lines in FIG. 2 of the drawings and a similar arm rest (not shown) is located between each of the seating stations A and B, and B and C. It should be understood that the seat backs A1, A1 and C1 as well as the armrests D are furnished with suitable stub shafts or pivot pins (not shown) which are operatively connected to the respective pivot bearings 28 and 30 in a well known manner to facilitate relative movement of the respective seat backs A1, B1 and C1 and arm rests D. In this manner, the seat back may be adjusted to a reclining position by a suitable reclining mechanism (not shown) of any well known variety. Similarly, the arm rests D may be pivoted in an upward direction to a storage position in the space provided for that purpose between the adjacently situated seat backs A1 and B1 and B1 and C1.

To facilitate the use of the seat support structure of the present invention in a variety of vehicles that may be provided with different seat locking track locations, each of the previously described horizontal tubular members 14 and 16 are provided with a plurality of laterally spaced apertures 14a and 16a respectively, which pass through both walls of each tubular member. These apertures 14a and 16a are adapted to receive mounting bolts 32 that are utilized to secure leg members 34 to the tubular members 14 and 16 in a manner which will be described in greater detail.

Each of the leg members 34 utilized in the seat support structure of the present invention is identical and completely interchangeable with one another. The leg members 34 are, as best seen in FIGS. 1 and 3, tapered and furnished with a pair of spaced flanges 36 at their upper end which are adapted to straddle the respective tubular members 14 and 16. Each spaced mounting flange 36 is provided with a pair of laterally spaced apertures (not shown) the spacing of which corresponds to the lateral spacing of the aforementioned apertures 14a and 16a that are furnished in the respective tubular members 14 and 16. As best seen in FIG. 3, the aforementioned mounting bolts 32 pass through the mounting flanges 36, spacing washers 35 situated between the tubular members 14 and 16 and the respective flanges and apertures 14a and 16a. Each mounting bolt 32 is secured by a lock nut 32a to fix each leg member 34 to the respective tubular members 14 and 16 at the desired location.

It should be noted in FIG. 1 that seat locking tracks T of a well known configuration are provided in the floor structures of most passenger aircraft as well as in many other types of vehicles. Although these locking tracks are usually constructed in standard well known configuration, their location may often vary according to the type and model of the particular aircraft. To accommodate these variations, the lateral spacing of the leg members 34 relative to the horizontal tubular members 14 and 16 can be adjusted by selecting different pairs of apertures 14a and 16a in the tubular members 14 and 16 through which the leg mounting flanges can be bolted. Consequently, the lateral position of the leg members 34 can be shifted to correspond to the location of the seat locking track T in a particular vehicle. It should also be noted that the leg mounting flanges 36 are capable of laterally straddling the enlarged portions 22 and 24 of the beam members as necessary in order to accommodate any leg position dictated by the location of the seat locking tracks T in the particular vehicle.

In addition, in FIG. 2 of the drawings, note should be taken of the fact that leg members 34 associated with tubular member 16 is affixed thereto at an angle so that the rear portion of the seat support structure and the seat cushion associated therewith will be situated closer to the vehicle floor than the forward portion of the seat structure. Such an arrangement enhances seating comfort as well as the energy absorbing capabilities of the seat structure so that in the event of an occurrence that would impose severe loads on the structure, a maximum amount of the destructive forces can be absorbed by the structure before a progressive and ultimate catastrophic failure of the seat support structure is achieved. As a consequence, seat occupants, fastened therein in the usual manner by seat belts or the like, would be less exposed to the resulting destructive forces of an accident.

The lower end of each of the aforementioned leg members 34 is provided with a bifurcated end portion 34a as best seen in FIGS. 1 and 4 of the drawings and is adapted to accommodate a channeled bracing member 42 which extends in a fore and aft direction and one or more track locking pins 43 which depend from an attachment fixture 43a or block (not shown) that are also accommodated between the bifurcated end portion 34a of the legs 34. The bifurcated portion 34a of the forwardmost leg member 34 as well as the channeled bracing member 42 also accommodates one end of a diagonal bracing member 44, the latter having a portion of its upper surface, designated 42a in the drawing, removed to allow the diagonal bracing member 44 to be received therebetween. A fastening bolt 45 with suitable lock nuts (not shown) passes through the bifurcated end portion 34a of each leg member 34, the attachment fixture 43a or block (not shown) from which the locking pins 43 depend and one end of the diagonal bracing member 44 to tie the structure together. The upper end of the diagonal bracing member 44 is fastened in a conventional manner to lug member 34b that is provided for that purpose on the upper region of each leg.

In addition, each leg member 34 is provided with a slot 48 at some point above the bifurcated end portion 34a as best seen in FIG. 4, to accommodate a baggage restraining bar 50 which passes through the slot in each forward leg member 34. The baggage restraining bar extends beneath the seats and has a portion that curves so that the bar 50 runs for a short distance in a direction parallel to the aisle adjacent the seats. The bar 50 then curves in an upward direction to meet the horizontal tubular member 16 of the seat support structure to which it may be fastened in any convenient manner (not shown).

As a consequence, any parcels that may be placed beneath the seats will be prevented from moving forward or into the adjacent aisle space by the bar 50.

Although the invention has been described with reference to certain preferred embodiments, it will be understood that variations and modifications may be made within the spirit and scope of the invention as defined in the appended claims.

What is claimed is:

1. Supporting means for vehicle seats having seat cushions and locatable in a vehicle with a floor comprising in combination a pair of tubular members located to be horizontally disposed beneath the seat cushions of the seat, a plurality of spacing members operatively connected to said tubular members and adapted to maintain said tubular members in a fixed spaced relationship, a pair of leg members fastened to each of said tubular members to support said tubular members a fixed distance above the floor of the vehicle, said leg members having a bifurcated upper and lower portion, said bifurcated upper portion and bifurcated lower portion being disposed substantially perpendicular to one another, the upper bifurcated portion of said leg member being adapted to straddle said tubular member, and means for operatively connecting said leg members to said tubular members at varying locations thereon, said means for operatively connecting said leg members comprising fastening means to secure said leg members to said tubular members.

2. The seat support structure of claim 1 wherein said spacing members are interchangeable and include separate cylindrical portions adapted to receive said tubular members.

3. The seat support structure of claim 2 wherein each of said cylindrical portions in said spacing member is disposed in a different horizontal plane.

4. The seat support structure of claim 2 wherein said spacing members include pivot means for a movable seat back operatively connected thereto.

5. The seat support structure of claim 4 including pivot means on said spacing members for a movable arm rest operatively connected thereto.

6. The seat support structure of claim 4 including a seat cushion supporting member disposed between and operatively connected to said spaced tubular members.

7. The seat support structure of claim 1 wherein said fastening means to secure said leg members to said tubular members includes a fastener adapted to pass through said bifurcated upper portion of a leg member and an aperture in said tubular member.

8. The seat support structure of claim 1 wherein said means for operatively connecting said leg members comprises a plurality of spaced apertures in said tubular members.

* * * * *